July 31, 1945.   P. S. LANE ET AL   2,380,654
METHOD OF PISTON RING MANUFACTURE
Filed Nov. 30, 1942

Inventors
Paul S. Lane
Douglas Hamm
By Liverance & Van Antwerp
Attorneys

Patented July 31, 1945

2,380,654

UNITED STATES PATENT OFFICE 2,380,654

METHOD OF PISTON RING MANUFACTURE

Paul S. Lane and Douglas Hamm, Muskegon, Mich., assignors to Muskegon Piston Ring Company, Muskegon, Mich., a corporation of Michigan Application November 30, 1942, Serial No. 467,410

3 Claims. (Cl. 29—156.6)

The present invention relates to a method of making piston rings and particularly to a method of producing a piston ring at the outer bearing face of which it is plated with a metal of different characteristics than the cast iron from which the ring is made. Particularly, the present invention is concerned with rings of this type or character which are chromium plated at their outer bearing faces and which are used considerably in airplane engines. Rings thus plated with chromium have also been applied to internal combustion engines of the regular and also of the Diesel type.

Plating with chromium, particularly the bearing faces of piston rings, has resulted in a marked increase in consumption of oil. The chromium surface being very hard does not wear to seating as readily as a ring having an outer bearing face of cast iron. Moreover, it has been found necessary to round the corners when a chromium plate is applied to the piston ring in order to prevent spalling or flaking off of the chromium deposits. Such flaking off of particles of chromium is very undesirable because with the exceedingly hard character of the chromium when it is flaked off there is introduced into an engine cylinder abrasive which is detrimental to the inner walls of the cylinder and to the piston, also to other rings which may not have a chromium bearing surface to operate against the cylinder walls.

Rounding off the corners of a piston ring destroys to a considerable degree any oil scraping effect of the ring and tends to cause the ring to sled over the oil film on the cylinder walls on the piston down stroke.

Our invention is directed to a method of producing a ring which avoids these difficulties in previous rings plated at their outer curved surfaces with chromium. The invention is also of value in plating rings with other metals than chromium such as copper, cadmium, tin and the like, though of greater value in conjunction with the chromium plated rings.

An understanding of the invention may be had from the following description taken in connection with the accompanying drawing, in which.

Figure 1:
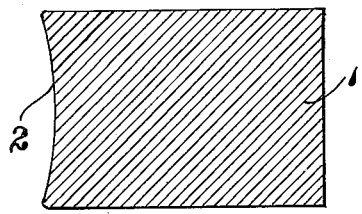

Fig. 1 is an enlarged section through a piston ring illustrating the first step of the method of producing the ring, namely, the provision of an outside or outer bearing face of the ring with a continuous shallow concave recess therearound.

Figure 2:
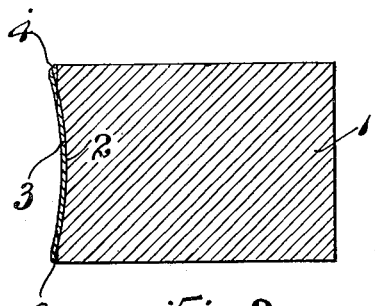
Figure 3:
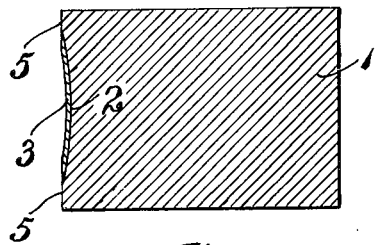

Fig. 2 is a similar view showing said outer curved bearing surface plated with a metallic coating such as chromium or other selected metal, and Fig. 3 shows in a similar view the completed ring wherein at the upper and lower outer corner portions of the ring it is removed to expose relatively narrow cast iron bearing lands which lands are continued from the cast iron to the plating metal which has been used.

Like reference characters refer to like parts in the different figures of the drawing.

With our invention a piston ring 1 of conventional form having parallel upper and lower flat sides, an inner curved side and an outer or exteriorly curved bearing face is provided. The first step in the method which is followed to produce the completed ring is to machine the ring at its outer bearing face to form a relatively wide, shallow, concave recess around the ring, as indicated at 2, said recess extending substantially the full axial dimension of the ring. If desired however the groove may be stopped either side of the gap.

The succeeding step is to plate the outer surface of the ring with the metallic plating, for example, chromium. The plating is indicated as applied to the outer concave face of the ring, as indicated at 3, said plating extending substantially to the opposite upper and lower flat sides of the ring. The ring at its upper and lower outer corners may be slightly rounded if desired for a better adherence of the plating through said rounding is not essential.

In the final finishing operation of the ring it is ground or machined at its upper and lower corner portions along the line indicated at 4 to remove portions of the plated metal at such corner portions and also slight portions of the material of the ring 1. It is of course to be understood that initially the piston ring will have an over size to provide for the metal which is removed in the final or completing step of the metal used.

On such grinding or other equivalent machining of the ring there will be left bearing lands 5 of the cast iron material of the ring 1 between which the plated metal 3 not removed by the finishing is located, said metal deposited by plating at its edges being ground or machined to lie flush with the lands 5.

With the piston ring as thus made there is a quick seating in connection with the cast iron lands due to the high unit pressure provided by the inherent tension of the ring when it is closed at its parting which is transmitted to the relatively limited bearing areas of the cast iron coming against the cylinder wall. The outer corners of the ring are of a sharp and not rounded character so that the desired scraping effect of the ring against the cylinder walls to remove excess oil is present. Lubrication for the ring is retained in the recessed portion of the outer face of the ring. There is a bimetallic contact of the ring against the cylinder walls which retards rapid wear and scuffing of the cast iron, such retardation of wear being particularly marked with harder metals used in plating such as chromium and to some extent with copper. In the case of softer metals used for plating the wear is not retarded but the softer metals serve to help the ring operation by feeding limited quantities thereof as the ring wears preventing scoring of cylinders and scuffing of rings.

In all of the rings, irrespective of the plating metal which is used, there are provided the narrow bearing lands for seating which become wider as the ring wears and with the ring supplied with a minor quantity of lubrication between its lands. When the harder metals are used, particularly chromium, the adherence of the chromium and insurance against spalling and flaking off is complete. The ring seats quickly and the wear of the ring is greatly reduced, lubrication and diminution of wear adding to the life of the ring and permitting it to undergo extremely severe service.

Having thus described our invention what we desire to secure and claim as Letters Patent is as follows:

1. The method of producing a piston ring which consists, in providing a ring of larger exterior diameter than the selected ring diameter to be produced, forming a shallow annular recess of concave form in the outer surface of the ring reaching from one side to the other of the ring, the diameter of the ring at the bottom of said recess being less than the selected exterior ring diameter, applying a metallic plating to the outer exterior curved surface of the ring and over said recessed portion, and finishing the ring to selected size by machining and cutting away portions of the plating and the ring continuously around the same at its opposite outer corner portions, whereby spaced apart lands partly of the material of the ring and partly of the plating applied are made between which is a recessed portion covered with the applied plating.

2. The method of producing a piston ring which consists in providing a ring having an exterior diameter greater than the preselected diameter of the ring to be produced, providing the ring at its outer curved surface with a continuous annular shallow recess of concave form therearound extending between the opposite flat sides of the ring, applying a metallic plating of harder material than the material from which the ring is made to said outer curved surface of the ring, and cutting from the ring at opposite sides of the recess continuously therearound material to reduce the ring to the preselected exterior dimensions therefor, thereby forming lands and sharp corners at the upper and lower sides of the rings, said lands having the major portion thereof of the ring material, with narrower portions of the plating applied flush with said lands and with the recessed portions of the ring between said lands covered with said plating.

3. The method of producing a piston ring which consists, in providing a ring of cast iron material of a larger exterior diameter than the selected diameter of the finished ring, providing a shallow recess of concave form continuously around the ring extending between its opposite flat sides, the diameter of the ring at the bottom of said recess being less than the selected finished diameter of the ring, plating the exterior curved surface of said ring with chromium and machining said ring at its exterior curved surface to selected exterior diameter size, thereby providing spaced upper and lower lands adapted to bear against a cylinder wall, portions of said lands being of cast iron and others of chromium, the intervening recessed portion of the ring between the lands being wholly covered with chromium.

PAUL S. LANE.
DOUGLAS HAMM.